(12) United States Patent
Lyu

(10) Patent No.: US 9,998,183 B2
(45) Date of Patent: Jun. 12, 2018

(54) ANTENNA ALIGNMENT METHOD AND SYSTEM

(71) Applicant: Huawei Technologies Co., Ltd., Shenzhen (CN)

(72) Inventor: Rui Lyu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days. days.

(21) Appl. No.: 15/636,894

(22) Filed: Jun. 29, 2017

(65) Prior Publication Data

US 2017/0302338 A1    Oct. 19, 2017

Related U.S. Application Data

(63) Continuation of application No. PCT/CN2014/095747, filed on Dec. 31, 2014.

(51) Int. Cl.
*H04B 7/02* (2018.01)
*H04B 7/06* (2006.01)

(52) U.S. Cl.
CPC ............. *H04B 7/02* (2013.01); *H04B 7/066* (2013.01); *H04B 7/0613* (2013.01); *H04B 7/0695* (2013.01)

(58) Field of Classification Search
CPC ..... H04L 1/0618; H04L 1/06; H04L 25/0204; H04L 27/2647; H04L 5/0007; H04L 27/2657; H04L 27/2662; H04L 5/0048; H04L 25/4902; H04L 1/0009; H04L 1/0041; H04L 25/49; H04B 7/0417; H04B 7/0669; H04B 3/54
(Continued)

(56) References Cited

U.S. PATENT DOCUMENTS

| | | |
|---|---|---|
| 2002/0039912 A1 | 4/2002 | Yamaguchi et al. |
| 2005/0070331 A1 | 3/2005 | Higuchi et al. |

(Continued)

FOREIGN PATENT DOCUMENTS

| | | |
|---|---|---|
| CN | 1346221 A | 4/2002 |
| CN | 101416416 A | 4/2009 |

(Continued)

*Primary Examiner* — Zewdu Kassa
(74) *Attorney, Agent, or Firm* — Slater Matsil, LLP

(57) ABSTRACT

An antenna alignment method and system, with the system having a first device having $N_{AT}$ transmit beams and $N_{AR}$ receive beams. The system has a second device having $N_{BT}$ transmit beams and $N_{BR}$ receive beams. The first device transmits a signal to the second device according to a first cycle, and traverses switching of $N_{AT}$ transmit beams according to a third beam mode. The second device receives a signal from the first device according to the first cycle, and traverses switching of $N_{BR}$ receive beams according to a fourth beam mode, counts a receive signal power in each first cycle, and obtains a receive signal power corresponding to each receive beam according to the fourth beam mode, to determine that a receive signal power corresponding to an Sth receive beam is the highest, and uses the Sth receive beam as a receive beam.

20 Claims, 10 Drawing Sheets

(58) Field of Classification Search
USPC .................. 375/267, 260, 259, 316, 219
See application file for complete search history.

(56) References Cited

U.S. PATENT DOCUMENTS

| | | |
|---|---|---|
| 2007/0205943 A1 | 9/2007 | Nassiri-Toussi et al. |
| 2008/0088518 A1 | 4/2008 | Charash et al. |
| 2013/0102345 A1 | 4/2013 | Jung |
| 2013/0156120 A1 | 6/2013 | Josiam et al. |
| 2013/0301567 A1 | 11/2013 | Jeong et al. |
| 2014/0055302 A1 | 2/2014 | Jia |
| 2014/0254515 A1 | 9/2014 | Kim et al. |
| 2015/0325912 A1 | 11/2015 | Liu |
| 2016/0006122 A1 | 1/2016 | Seol et al. |

FOREIGN PATENT DOCUMENTS

| | | |
|---|---|---|
| CN | 103052086 A | 4/2013 |
| CN | 103596245 A | 2/2014 |
| WO | 2014021633 A1 | 2/2014 |
| WO | 2014116090 A1 | 7/2014 |

ANTENNA ALIGNMENT METHOD AND SYSTEM

CROSS-REFERENCE TO RELATED APPLICATIONS

This application is a continuation of International Application No. PCT/CN2014/095747, filed on Dec. 31, 2014, the disclosure of which is hereby incorporated by reference in its entirety.

TECHNICAL FIELD

Embodiments of the present invention relate to the field of communications technologies, and in particular, to an antenna alignment method and system.

BACKGROUND

In a microwave device equipped with an electrical tilt array antenna, each array element of the array antenna includes a phase shifter for changing a signal phase. These phase shifters are controlled by using an electrical signal, so that an expected radiation beam is formed on the array antenna. When performing communication, the microwave device needs to align both a beam of a transmit antenna and a beam of a receive antenna with those of a peer microwave device.

In the prior art, a peer microwave device needs to detect and determine beam alignment of a local microwave device, and transfers back determining information to the local microwave device. However, before a beam is aligned, a communication link cannot work normally, and an additional feedback channel needs to be set up. This causes high costs and is difficult to implement.

SUMMARY

Embodiments of the present invention provide an antenna alignment method and system, used to implement antenna alignment.

According to a first aspect, an embodiment of the present invention provides an antenna alignment method, where a first device has $N_{AT}$ transmit beams and $N_{AR}$ receive beams, a second device has $N_{BT}$ transmit beams and $N_{BR}$ receive beams, each receive beam of the first device is fixedly aligned, each receive beam of the second device is fixedly aligned, the receive beams of the first device receive signals from the transmit beams of the second device, the receive beams of the second device receive signals from the transmit beams of the first device, and the method includes transmitting, by the first device, a signal to the second device according to a first cycle, traversing switching of $N_{AT}$ transmit beams according to a first beam mode, and traversing switching of $N_{BT}$ frequencies according to a first frequency mode, where a transmit beam and a frequency for transmitting a signal by the first device are unchanged in a same first cycle, transmitting, by the second device, a signal to the first device according to the first cycle, traversing switching of $N_{BT}$ transmit beams according to a second beam mode, and traversing switching of $N_{AT}$ frequencies according to a second frequency mode, where a transmit beam and a frequency for transmitting a signal by the second device are unchanged in a same first cycle, counting, by the second device, a receive signal power in each first cycle, and obtaining a receive signal power corresponding to each frequency according to the second frequency mode, to learn that a receive signal power corresponding to an Rth frequency is the highest, transmitting, by the second device, a signal to the first device according to the first cycle, traversing switching of $N_{BT}$ transmit beams according to the second beam mode, and traversing switching of $N_{AT}$ frequencies according to the second frequency mode, where a transmit beam and a frequency for transmitting a signal by the second device are unchanged in a same first cycle, and the Rth frequency of the $N_{AT}$ frequencies is a specified frequency, determining, by the first device, a receive signal frequency in each first cycle, and obtaining a receive signal frequency corresponding to each beam according to the first beam mode, to learn that a receive signal frequency corresponding to an Rth beam is the specified frequency, and permanently using, by the first device, a beam whose receive signal frequency is the specified frequency as a transmit beam.

According to a second aspect, an embodiment of the present invention provides an antenna alignment method, where a first device has $N_{AT}$ transmit beams and $N_{AR}$ receive beams, a second device has $N_{BT}$ transmit beams and $N_{BR}$ receive beams, and the method includes transmitting, by the first device, a signal to the second device according to a first cycle, and traversing switching of $N_{AT}$ transmit beams according to a third beam mode, where a transmit beam for transmitting a signal by the first device is unchanged in a same first cycle, receiving, by the second device, a signal from the first device according to the first cycle, and traversing switching of $N_{BR}$ receive beams according to a fourth beam mode, where a receive beam for receiving a signal by the second device is unchanged in a same first cycle, and each receive beam can receive signals from the $N_{AT}$ transmit beams of the first device, counting, by the second device, a receive signal power in each first cycle, and obtaining a receive signal power corresponding to each receive beam according to the fourth beam mode, to learn that a receive signal power corresponding to an Sth receive beam is the highest; and fixing, by the second device, a receive beam whose receive signal power is the highest as a receive beam.

According to a third aspect, an embodiment of the present invention provides an antenna alignment system, including a first device and a second device, where the first device has $N_{AT}$ transmit beams and $N_{AR}$ receive beams, the second device has $N_{BT}$ transmit beams and $N_{BR}$ receive beams, each receive beam of the first device is fixedly aligned, each receive beam of the second device is fixedly aligned, the receive beams of the first device receive signals from the transmit beams of the second device, and the receive beams of the second device receive signals from the transmit beams of the first device, the first device is configured to transmit a signal to the second device according to a first cycle, traverse switching of $N_{AT}$ transmit beams according to a first beam mode, and traverse switching of $N_{BT}$ frequencies according to a first frequency mode, where a transmit beam and a frequency for transmitting a signal by the first device are unchanged in a same first cycle, the second device is configured to transmit a signal to the first device according to the first cycle, traverse switching of $N_{BT}$ transmit beams according to a second beam mode, and traverse switching of $N_{AT}$ frequencies according to a second frequency mode, where a transmit beam and a frequency for transmitting a signal by the second device are unchanged in a same first cycle, the second device is configured to count a receive signal power in each first cycle, and obtain a receive signal power corresponding to each frequency according to the second frequency mode, to learn that a receive signal power corresponding to an Rth frequency is the highest, the second device is configured to transmit a signal to the first device according to the first cycle, traverse switching of $N_{BT}$ transmit beams according to the second beam mode, and traverse switching of $N_{AT}$ frequencies according to the second frequency mode, where a transmit beam and a frequency for transmitting a signal by the second device are unchanged in a same first cycle, and the Rth frequency of the $N_{AT}$ frequencies is a specified frequency. The first device is configured to determine a receive signal frequency in each first cycle, and obtain a receive signal frequency corresponding to each beam according to the first beam mode, to learn that a receive signal frequency corresponding to an Rth beam is the specified frequency, and the first device is configured to fix a beam whose receive signal frequency is the specified frequency as a transmit beam.

According to a fourth aspect, an embodiment of present invention provides an antenna alignment system, including a first device and a second device, where the first device has $N_{AT}$ transmit beams and $N_{AR}$ receive beams, and the second device has $N_{BT}$ transmit beams and $N_{BR}$ receive beams. The first device is configured to transmit a signal to the second device according to a first cycle, and traverse switching of $N_{AT}$ transmit beams according to a third beam mode, where a transmit beam for transmitting a signal by the first device is unchanged in a same first cycle, the second device is configured to receive a signal from the first device according to the first cycle, and traverse switching of $N_{BR}$ receive beams according to a fourth beam mode, where a receive beam for receiving a signal by the second device is unchanged in a same first cycle, and each receive beam can receive signals from the $N_{AT}$ transmit beams of the first device, the second device is configured to count a receive signal power in each first cycle, and obtain a receive signal power corresponding to each receive beam according to the fourth beam mode, to learn that a receive signal power corresponding to an Sth receive beam is the highest, and the second device is configured to fix a receive beam whose receive signal power is the highest as a receive beam.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Embodiments of the present invention relate to antenna alignment. A first device and a second device perform transmit antenna alignment and receive antenna alignment. The first device is marked as a device A, and the second device is marked as a device B. For ease of understanding and description, when the first device is used as a subject, the first device is a local device, and the second device is a peer device. When the second device is used as a subject, the second device is a local device, and the first device is a peer device. The first device has $N_{AT}$ preset transmit beams and $N_{AR}$ preset receive beams. The second device has $N_{BT}$ preset transmit beams and $N_{BR}$ preset receive beams. $N_{AT}$, $N_{AR}$, $N_{BT}$, and $N_{BR}$ are integers greater than 1. Transmit beams of the local device and receive antennas of the peer device need to be adjusted to be aligned, or transmit antennas of the peer device and receive antennas of the local device need to be adjusted to be aligned. The device in the embodiments of the present invention may be a microwave device, or another device that requires antenna alignment.

In an antenna alignment phase, two communications parties in the embodiments of the present invention use a narrowband signal of an adjustable frequency to perform alignment, such as using a monophonic signal of a single frequency. A transmitter performs switching action configuration according to a preset switching time cycle $T_c$. That is, switching of a transmit beam direction of the transmitter or switching of a transmit signal frequency of the transmitter uses $T_c$ as the smallest cycle. Within the time cycle $T_c$, configuration of the transmit beam direction of the transmitter and configuration of the transmit signal frequency of the transmitter are unchanged. A receiver performs power detection or frequency detection according to a detection time cycle $T_d$. That is, the receiver counts period by period a receive signal average power or a receive signal main frequency within the time cycle $T_d$. The switching time cycle $T_c$ may be greater than or equal to the detection time cycle $T_d$. Preferably, $T_c=N\times T_d$, and N is an odd number greater than or equal to 3.

The embodiments of the present invention relate to receive beam alignment or transmit beam alignment.

Figure 1:
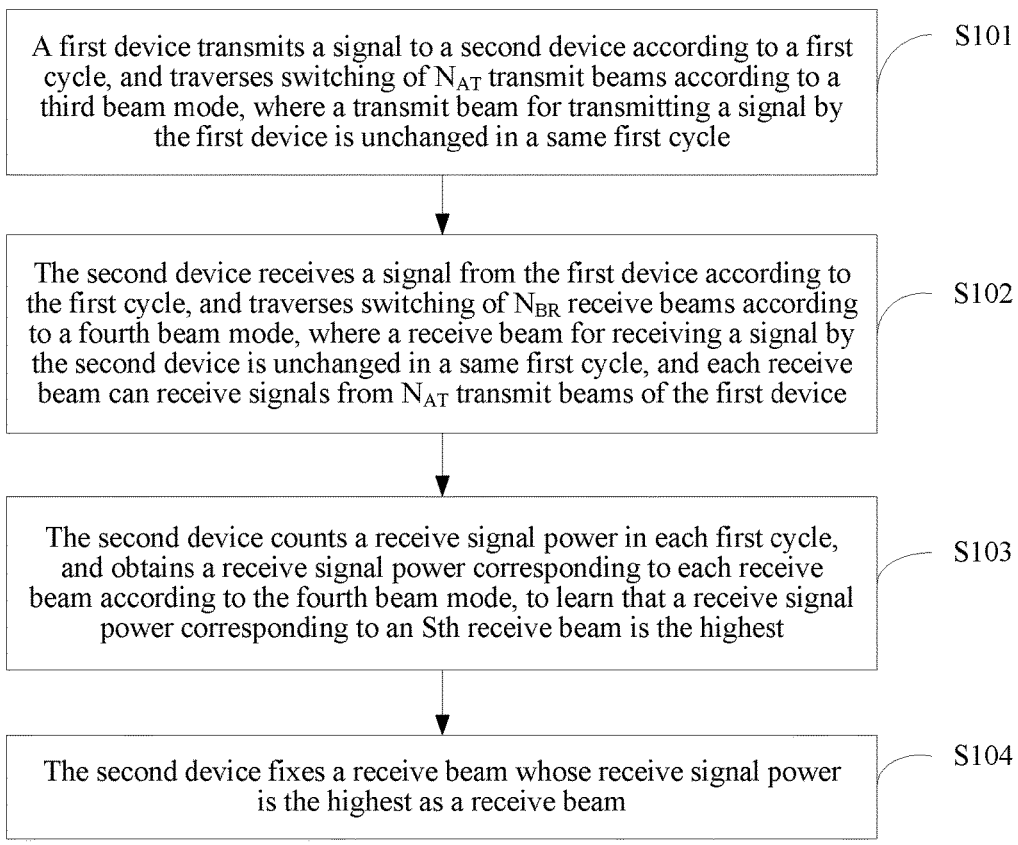
FIG. 1 is a flowchart of a receive beam alignment method according to an embodiment of the present invention.

As shown in FIG. 1, FIG. 1 is a flowchart of a receive beam alignment method according to an embodiment of the present invention, and the method includes the following steps.

S101. A first device transmits a signal to a second device according to a first cycle, and traverses switching of $N_{AT}$ transmit beams according to a third beam mode, where a transmit beam for transmitting a signal by the first device is unchanged in a same first cycle.

Figure 2:
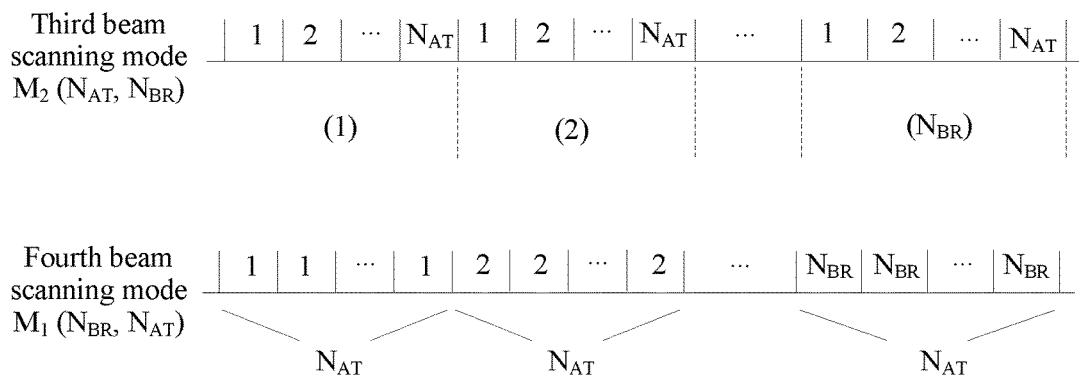
FIG. 2 is a configuration diagram of a beam mode according to an embodiment of the present invention.

As shown in FIG. 2, in this embodiment of the present invention, the third beam mode $M_2$ ($N_{AT}$, $N_{BR}$) may include $N_{AT}\times N_{BR}$ first cycles, the first cycle is the switching time cycle $T_c$ mentioned above, a transmit beam is switched once each first cycle, and a direction of a transmit beam for transmitting a signal is unchanged in a same first cycle.

A transmit signal frequency is an initial default frequency. Signal frequencies in different first cycles may be the same. In this embodiment, the default frequency is set as $F_r$, and a specified frequency is set as $F_d$.

S102. The second device receives a signal from the first device according to the first cycle, and traverses switching of $N_{BR}$ receive beams according to a fourth beam mode, where a receive beam for receiving a signal by the second device is unchanged in a same first cycle, and each receive beam can receive signals from $N_{AT}$ transmit beams of the first device.

As shown in FIG. 2, in this embodiment of the present invention, the fourth beam mode $M_1$ ($N_{BR}$, $N_{AT}$) may include $N_{AT}\times N_{BR}$ first cycles, the first cycle is the switching time cycle $T_c$ mentioned above, and a receive beam is switched once every $N_{AT}$ first cycles. Therefore, each receive beam can receive signals from $N_{AT}$ transmit beams of the first device.

In another embodiment, the third beam mode and the fourth beam mode may be implemented in many other manners, provided that each receive beam can receive signals from $N_{AT}$ transmit beams of the first device. For example, the third beam mode includes $N_{AT}\times N_{BR}$ first cycles, and a transmit beam is switched once every $N_{BR}$ first cycles. The fourth beam mode includes $N_{AT}\times N_{BR}$ first cycles, and a receive beam is switched once each first cycle. Certainly, the third beam mode and the fourth beam mode may not be orthogonal. However, through testing, a use effect is inferior to an effect of using two orthogonal scanning modes.

S103. The second device counts a receive signal power in each first cycle, and obtains a receive signal power corresponding to each receive beam according to the fourth beam mode, to learn that a receive signal power corresponding to an Sth receive beam is the highest.

The second device counts the receive signal power in each first cycle. The second device may perform power counting by using $T_c$ as a cycle, or certainly, may perform power counting by using $T_d$ as a cycle. For example, if $T_c=3\times T_d$, the switching time cycle is divided into three parts for separate detection, and a power accumulated value, a power average value, or the like of powers of the three times of detection is used as the receive signal power in the first cycle. The receive signal power corresponding to each receive beam is obtained according to the fourth beam mode. For example, as shown in FIG. 2, the first to the ($N_{AT}$)th first cycles correspond to a first receive beam, a receive signal power corresponding to this receive beam may be a receive signal power sum, a receive signal average power, or another characteristic value in the $N_{AT}$ first cycles. By analogy, receive signal powers corresponding to $N_{BR}$ receive beams can be obtained, so that a receive beam whose receive power is the highest can be obtained. In this embodiment, the receive signal power corresponding to the Sth receive beam is the highest.

In another embodiment, to enhance detection robustness, the second device may determine an optimal receive beam after consecutively obtaining multiple traversal counting results.

S104. The second device permanently uses a receive beam whose receive signal power is the highest as a receive beam.

In this embodiment, after obtaining an optimal receive beam, the second device locks a direction of a receive beam into a direction of the optimal beam, and changes a transmit signal frequency into $F_d$ during a next traversal. After receiving $F_d$, a peer device learns that the receive beam of the second device has been aligned.

Receive beam alignment of the first device can use the same method, and details are not described herein.

In this embodiment of the present invention, a method for identifying a device may be further included. After fixing the receive beam, the second device detects a receive signal frequency. If the frequency is not the specified frequency $F_d$, identifies the second device as a device 1, changes a transmit signal frequency into the specified frequency $F_d$, and continuously detects a receive signal frequency; and when detecting that the receive signal frequency is the specified frequency $F_d$, completes receive beam alignment; or if detecting that the frequency is the specified frequency $F_d$, identifies the second device as a device 2, changes a transmit signal frequency into the specified frequency $F_d$, and completes receive beam alignment.

In this embodiment, each receive beam of a second device can receive signals from $N_{AT}$ transmit beams of a first device, so that a receive beam that can be aligned can be determined, there is no need to construct an additional feedback channel, and the first device can be notified, by using a frequency change, that the second device has locked receive beam alignment.

Figure 3:
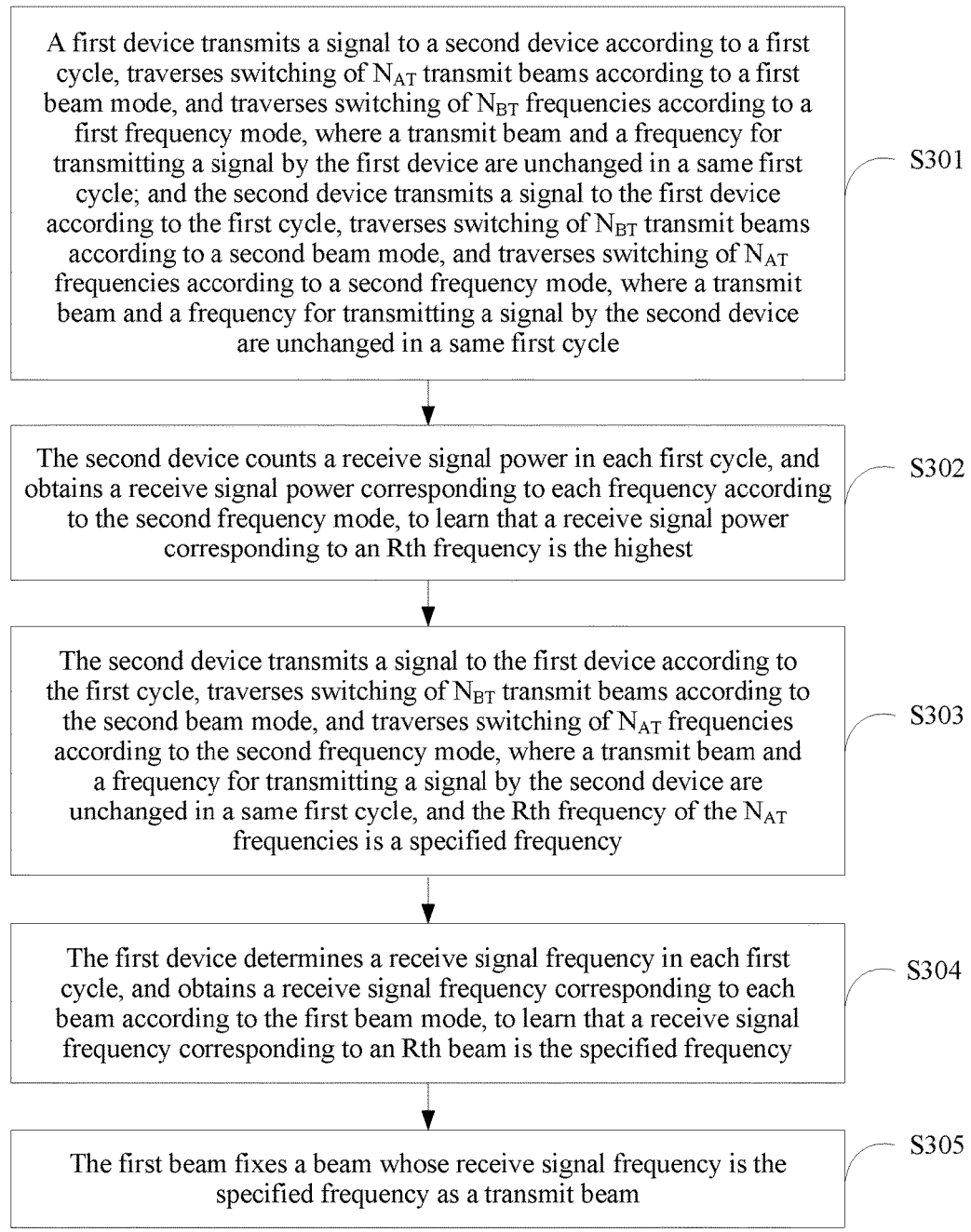
FIG. 3 is a flowchart of a transmit beam alignment method according to an embodiment of the present invention.

As shown in FIG. 3, FIG. 3 is a flowchart of a transmit beam alignment method according to an embodiment of the present invention. In this embodiment of the present invention, there is a precondition for transmit beam alignment, that is, a receive beam has been aligned. Receive beam alignment may be performed by using the method provided above, or certainly, receive beam alignment may be performed by using another method. This embodiment of the present invention does not impose a limitation thereto.

S301. A first device transmits a signal to a second device according to a first cycle, traverses switching of $N_{AT}$ transmit beams according to a first beam mode, and traverses switching of $N_{BT}$ frequencies according to a first frequency mode, where a transmit beam and a frequency for transmitting a signal by the first device are unchanged in a same first cycle; and the second device transmits a signal to the first device according to the first cycle, traverses switching of $N_{BT}$ transmit beams according to a second beam mode, and traverses switching of $N_{AT}$ frequencies according to a second frequency mode, where a transmit beam and a frequency for transmitting a signal by the second device are unchanged in a same first cycle.

Figure 4:
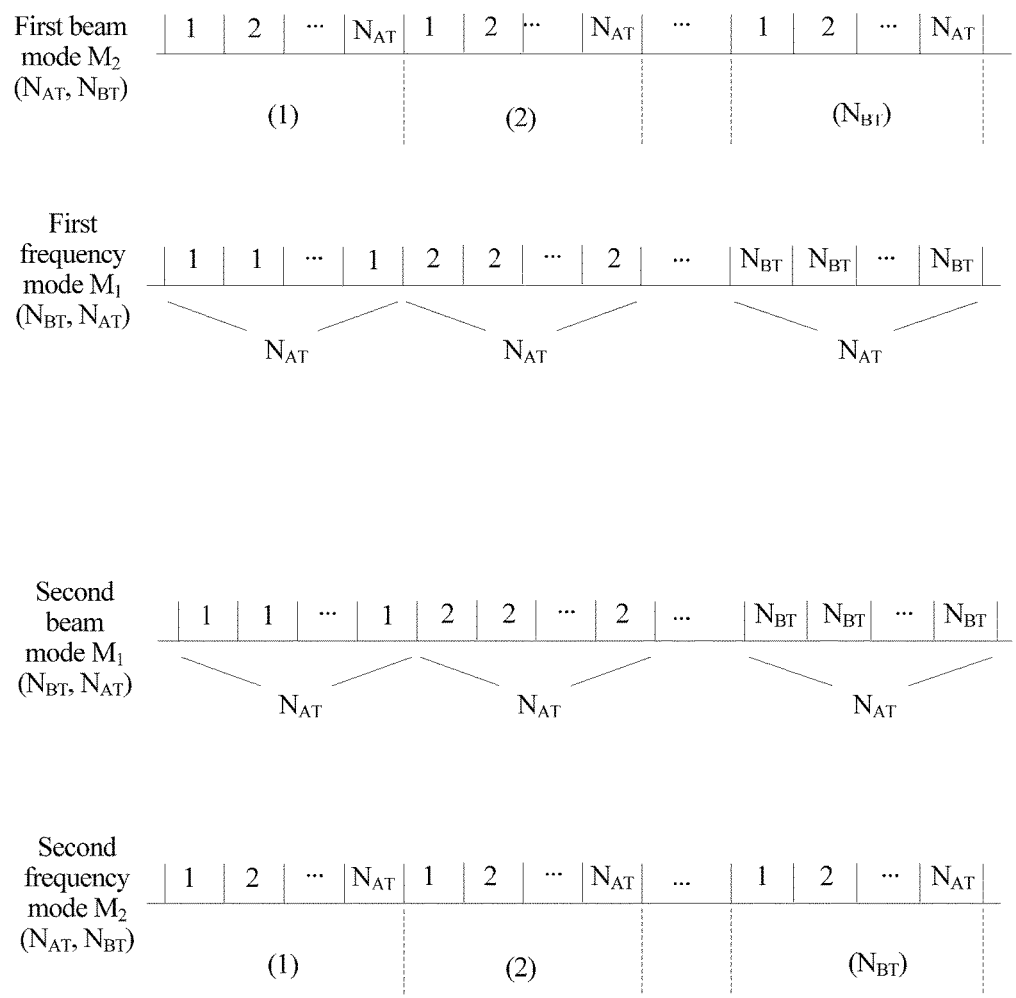
FIG. 4 is a configuration diagram of a beam mode and a frequency mode according to an embodiment of the present invention.

In this embodiment, the first beam mode and the first frequency mode may be shown in FIG. 4. The first beam mode $M_2$ ($N_{AT}$, $N_{BT}$) includes $N_{AT} \times N_{BT}$ first cycles, the first cycle is the switching time cycle $T_c$ mentioned above, and a transmit beam is switched once each first cycle. The first frequency mode $M_1$ ($N_{BT}$, $N_{AT}$) includes $N_{AT} \times N_{BT}$ first cycles, and a frequency is switched once every $N_{AT}$ first cycles.

In this embodiment, the second beam mode and the second frequency mode may be shown in FIG. 4. The second beam mode $M_1$ ($N_{BT}$, $N_{AT}$) includes $N_{AT} \times N_{BT}$ first cycles, the first cycle is the switching time cycle $T_c$ mentioned above, and a transmit beam is switched once every $N_{AT}$ first cycles. The second frequency mode $M_2$ ($N_{AT}$, $N_{BT}$) includes $N_{AT} \times N_{BT}$ first cycles, and a frequency is switched once each first cycle. The first frequency mode corresponds to the second beam mode, and the second frequency mode corresponds to the first beam mode, that is, their switching rules are the same.

All frequencies of different configuration numbers of the first device and the second device use a default frequency $F_d$. That is, the same frequencies are used for convenience of detection. In this embodiment, the default frequency is $F_d$, and a specified frequency is $F_m$.

In another embodiment, the first beam mode, the first frequency mode, the second beam mode, and the second frequency mode may be implemented by using many other manners, provided that the first frequency mode corresponds to the second beam mode, and the second frequency mode corresponds to the first beam mode. For example, the first beam mode includes $N_{AT} \times N_{BT}$ first cycles, and a transmit beam is switched once every $N_{BT}$ first cycles. The first frequency mode includes $N_{AT} \times N_{BT}$ first cycles, and a frequency is switched once each first cycle. The second beam mode includes $N_{AT} \times N_{BT}$ first cycles, and a transmit beam is switched once each first cycle. The second frequency mode includes $N_{AT} \times N_{BT}$ first cycles, and a frequency is switched once every $N_{BT}$ first cycles. Certainly, the first beam mode and the first frequency mode may not be orthogonal, and the second beam mode and the second frequency mode may either not be orthogonal. However, through testing, a use effect is inferior to an effect of using two orthogonal scanning modes.

When a device performs transmit beam alignment, there is a transmit signal frequency corresponding to a transmit beam each time configuration of the transmit beam is changed. Configuration is performed in pairs according to <beam-frequency> in each configuration cycle. For example, <$b_i$, $f_i$> indicates an ith beam $b_i$ and a transmit signal frequency $f_i$ used by the ith beam. The transmit beam $b_i$ is circulated in a cycle of a quantity Kl of transmit beams of a local device, that is, i=1, 2, ..., Kl. However, the transmit signal frequency $f_i$ is circulated in a cycle of a quantity Kr of transmit beams of a peer device, that is, i=1, 2, ..., Kr. For example, for the first device, Kl is $N_{AT}$, and Kr is $N_{BT}$. For the second device, Kl is $N_{BT}$, and Kr is $N_{AT}$.

Advantages of the orthogonal scanning modes are described herein. In a process of transmit beam alignment, because devices on two ends of a link perform scanning and searching at the same time, if quantities of transmit beams of the devices on the two ends are the same, that is, Kl=Kr, in configuration pairs <beam-frequency> of transmitters of the two devices, traversal cycles of a beam and a frequency are the same, and a collocation of a beam and a frequency is totally fixed. In this case, when a frequency $F_m$ sent by a device on one end and a transmit beam whose direction is offset appear at a same traversal location, this causes a risk that a receiver of a peer device cannot correctly detect the frequency $F_m$ because a receive signal power is extremely low. For example, both a quantity of transmit beams of a local device and a quantity of transmit beams of a peer device are 3, that is, Kl=Kr=3. If transmit beams and transmit signal frequencies of the local device are scanned in a continuous traversal manner, because a quantity of transmit signal frequencies of the local device corresponds to the quantity of transmit beams of the peer device, circulation cycles of a beam and a frequency are the same, and a beam direction and a frequency sequence number are in a fixed collocation in every traversal. It is assumed that an optimal direction of the transmit beam of the local device is a direction of a transmit beam B1. In this case, if the frequency $F_m$ appears in a cycle of number 3 frequency configuration F3, because a direction of a transmit beam B3 used in this case has a relatively large offset, the peer device may be unable to correctly detect the frequency $F_m$ because a received signal power is extremely low, and this causes a problem that the peer device cannot lock an optimal transmit beam by using the frequency $F_m$.

However, the foregoing problem can be avoided by adopting "orthogonal" scanning modes when transmitters of devices on two ends perform beam scanning. That is, in one scanning cycle, each transmit beam of a device on one end can appear at least once at the same time with all transmit beams of the peer device, and vice versa. In the orthogonal scanning modes, because a transmit signal frequency change of a local device is decided by a scanning mode of a transmit beam of a peer device, in a complete <beam-frequency> configuration cycle, there are orthogonal combinations between all frequency configuration and all transmit beams, thereby ensuring that the peer device can effectively detect a receive signal frequency change in a case of a relatively high receive power.

S302. The second device counts a receive signal power in each first cycle, and obtains a receive signal power corresponding to each frequency according to the second frequency mode, to learn that a receive signal power corresponding to an Rth frequency is the highest.

In this embodiment, the second device counts a receive signal power according to the first cycle. The first cycle is a cycle for transmitting a signal to the first device by the second device. The second device may perform detection according to a detection time cycle $T_d$ during power detection. For example, if $T_c=3 \times T_d$, a switching time cycle is divided into three parts for separate detection, and a power accumulated value, a power average value, or the like of powers of the three times of detection is used as the receive signal power in the first cycle. Certainly, powers may be also directly counted according to $T_c$. The receive signal power corresponding to each frequency is obtained by means of calculation according to the second frequency mode of the second device. For example, as shown in FIG. 4, $N_{BT}$ first cycles: the first cycle, an ($N_{AT}+1$)th cycle, ..., an [($N_{BT}-1) \times N_{AT}+1$]th cycle, correspond to a first frequency. A receive signal power corresponding to this frequency may be a receive signal power sum, a receive signal average power, or another characteristic value of the $N_{BT}$ first cycles. By analogy, receive signal powers corresponding to $N_{AT}$ frequencies can be obtained, so that a frequency whose receive power is the highest can be obtained. In this embodiment, the receive signal power corresponding to the Rth frequency is the highest. The second device may search for the largest value in the $N_{AT}$ accumulated powers. A configuration cycle in which a frequency number corresponding to the highest power is located is a configuration cycle when the first device uses an optimal transmit beam. It is assumed that the frequency number corresponding to the highest accumulated power obtained in this case is R. To enhance detection robustness, the second device may determine a frequency whose receive power is the highest after consecutively obtaining multiple traversal counting results, that is, the second device determines the optimal transmit beam of the first device.

After a device completes receive beam alignment, a beam of a receive end is locked into a correct beam direction. In this case, a receive signal power of a receiver indicates an alignment status of a transmit beam of a peer device. A correct direction of the transmit beam of the peer device can be found by comparing amplitudes of receive powers of the receiver. A receiver of a local device first detects a receive signal power $P_d$ according to the cycle $T_d$, and obtains an average receive power $P_c$ in one configuration cycle $T_c$ by averaging consecutive N detection powers $P_d$. Because in a peer device, Kr transmit beams are switched circularly, after powers $P_c$ in Kr configuration cycles are consecutively obtained, the receiver of the local device can obtain a power change status of a transmit beam of the peer device in a complete traversal. By searching for a location of the largest value in Kr pieces of $P_c$, a location, of a direction of an optimal transmit beam of the peer device, in a traversal sequence can be obtained. In this case, a traversal manner for counting a power by the receiver of the device is the same as a traversal manner of a signal frequency of a transmitter of the device.

S303. The second device transmits a signal to the first device according to the first cycle, traverses switching of $N_{BT}$ transmit beams according to the second beam mode, and traverses switching of $N_{AT}$ frequencies according to the second frequency mode, where a transmit beam and a frequency for transmitting a signal by the second device are unchanged in a same first cycle, and the Rth frequency of the $N_{AT}$ frequencies is a specified frequency.

In this embodiment, after determining a frequency whose receive power is the highest, in a next transmit traversal, the second device changes a corresponding frequency into the specified frequency, and other frequencies remain unchanged. For example, the Rth frequency is changed into the specified frequency.

The second device transfers a receive power change to the peer device by using a transmit signal frequency change. In an initial state after a device completes receive beam alignment, all transmit signal frequencies are set to a default value $F_d$. The device changes a transmit signal frequency corresponding to a transmit beam according to a power detection status of a receiver. After a receiver of the local device has counted a Kr power in a complete traversal of the peer device, a location R, at which an optimal transmit beam of the peer device is located, in a traversal sequence is found. In the subsequently started another traversal process, a transmitter of the local device sets a transmit signal frequency fR corresponding to the location R to a specified frequency $F_m$ from an original $F_d$.

S304. The first device determines a receive signal frequency in each first cycle, and obtains a receive signal frequency corresponding to each beam according to the first beam mode, to learn that a receive signal frequency corresponding to an Rth beam is the specified frequency.

In this embodiment, the first device determines the receive signal frequency in each first cycle. The first cycle is a cycle for transmitting a signal to the second device by the first device. The first device can performing frequency determining according to a detection time cycle $T_d$. For example, if $T_c=3\times T_d$, a switching time cycle is divided into three parts for separate determining, a frequency that occurs most is counted and used as a main frequency in the switching time cycle. That is, the frequency of the largest occurrence quantity is used as the receive signal frequency in the first cycle. The receive signal frequency corresponding to each beam is obtained according to the first beam mode. For example, as shown in FIG. 4, $N_{BT}$ first cycles: the first cycle, an $(N_{AT}+1)$th cycle, ..., an $[(N_{BT}-1)\times N_{AT}+1]$th cycle, correspond to a first beam. A receive signal power corresponding to the beam may be a frequency that occurs most among receive signal frequencies in the $N_{BT}$ first cycles, or a frequency determined in a specific cycle or some cycles of the $N_{BT}$ first cycles. By analogy, receive signal frequencies corresponding to $N_{AT}$ beams can be obtained, so that it can be learned that a frequency of which beam is changed compared with the default frequency, and a transmit beam that can be aligned can be determined. In this embodiment, the receive signal frequency corresponding to the Rth beam is the specified frequency.

The first device extracts transmit beam alignment information by detecting a receive signal frequency change. After a device completes receive beam alignment, a beam of a receive end is locked into a correct beam direction, and then a receiver starts to perform receive signal frequency detection. A receiver of the first device first detects a receive signal frequency $Q_d$ according to a cycle $T_d$, and determines the detected frequency $Q_d$ as $F_d$ or $F_m$ according to the nearest neighbor principle. After obtaining consecutive N detected frequencies $Q_d$ in one configuration cycle $T_c$, the first device counts a frequency that occurs most in the frequencies and uses the frequency as a main frequency $Q_c$ in the configuration cycle. Receive signal frequencies are traversed and counted by a peer device according to a cycle of a beam quantity Kl of a local device, and a location of a highest receive power in the circulation cycle is identified by using a frequency. Therefore, when detecting that a main frequency in a specific configuration cycle R is $F_m$, the local device can determine that a transmit beam bc used in the configuration cycle is an optimal transmit beam direction. To enhance detection robustness, a determining criterion may be further improved as follows: If configuration cycles in which $F_m$ is located for several consecutive times are R, the transmit beam bc used in the configuration cycle can be determined as the optimal transmit beam direction.

Figure 5:
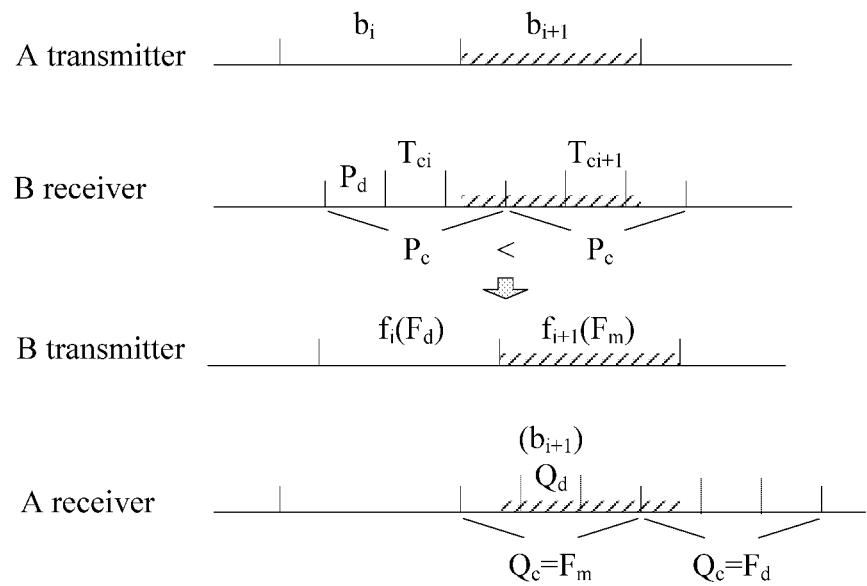
FIG. 5 is a schematic diagram of information transfer in a non-synchronization case according to an embodiment of the present invention.

Because the devices on two ends cannot implement time synchronization in an initial communication phase, there is an unknown offset between starting time points of configuration cycles $T_c$ in the two devices. Due to this offset, a configuration boundary of the peer device is crossed when a receiver of the local device detects a transmit signal power and a transmit signal frequency of the peer device according to a configuration cycle of the local device. However, because a detection cycle $T_d$ of a smaller time granularity is used, this boundary crossed problem does not affect a detection result. As shown in FIG. 5, when a receiver of a device B performs power detection for a signal of a transmitter of a device A, a configuration cycle corresponding to $b_{i+1}$ of the device A crosses two configuration cycles $T_{ci}$ and $T_{ci+1}$ of the device B. In the two configuration cycles of the device B, there is always one configuration cycle (such as $T_{ci+1}$) that has a larger overlap with the configuration cycle of the device A. In this case, a signal power of the device A is mainly reflected by an average power in $T_{ci+1}$ of the device B that has a larger overlap. Subsequently, a detection result of the signal power of the device A is fed back to the device A by using a transmit signal frequency of the device B. The configuration cycle of the device B is used during the feeding back. Therefore, when a receiver of the device A detects a signal frequency of a transmitter of the device B, a configuration cycle that is of the receiver of the device A and has a larger overlap with $f_{i+1}$ of the device B is still the configuration cycle corresponding to the original $b_{i+1}$. In this case, the frequency $F_m$ is detected in more $T_d$ in the configuration cycle. Therefore, a main frequency of a configuration cycle in which $b_{i+1}$ of the device A is located is $F_m$, and the device A can correctly detect an optimal transmit beam direction.

Optionally, the receiver of the first device counts a receive signal main frequency in each configuration cycle according to a beam scanning mode of the first device. When detecting a receive signal frequency, the receiver first determines an amplitude of the receive signal power, and only when the receive power is greater than a specific threshold, the receiver detects the receive signal frequency. For a signal whose receive power is less than the threshold, the receiver outputs invalid frequency identification.

After the receiver of the first device completes complete frequency detection once, the receiver searches validly detected frequency identification for a location in which a frequency $F_m$ is located. A beam number corresponding to the location in the beam scanning mode is an optimal transmit beam of the first device. To enhance detection robustness, after the first device continuously performs traversal counting for many times, a beam number that occurs most of $F_m$ is used as the optimal transmit beam of the first device.

S305. The first device permanently uses a beam whose receive signal frequency is the specified frequency as a transmit beam.

The first device locks its transmit beams into a direction of the optimal transmit beam after finding the optimal transmit beam, stops detecting a receive signal frequency, performs power detection similar to that in step S302, and determines a fluctuation status of $N_{BT}$ accumulated powers. When a fluctuation quantity of the $N_{BT}$ accumulated powers is less than a specific threshold (such as 10% of an average value), the first device can determine that the second device has completed transmit beam locking. The first device completes all beam alignment work, and switches to a normal communication state.

Transmit beam alignment of the second device is similar to the foregoing alignment. In step S302, the first device counts a receive signal power in each first cycle, obtains a receive signal power corresponding to each frequency according to the first frequency mode, and finds a frequency value corresponding to the highest receive signal power. Then, in step S303, the first device transmits a signal to the second device according to the first cycle, traverses switching of $N_{BT}$ transmit beams according to the first beam mode, traverses switching of $N_{AT}$ frequencies according to the first frequency mode, and changes a corresponding frequency value. Then, the second device can determine a transmit beam alignment status according to the received signal. Details are not described herein.

In this embodiment, transmit beam alignment is identified by using transmit beam changes and frequency changes of two beams, and a peer device is notified of alignment information by using a specific frequency change, so that the peer device can lock its transmit beam to complete transmit beam alignment, and there is no need to construct an additional feedback channel.

For ease of understanding, specific parameters are used as examples in the following to describe a key process of receive and transmit beam alignment between a microwave device A and a microwave device B. The device A has two preset transmit beams, and it is assumed that a beam 2 is an optimal transmit beam. The device A has two preset receive beams, and it is assumed that a beam 1 is an optimal receive beam. The device B has three preset transmit beams, and it is assumed that a beam 3 is an optimal transmit beam. The device B has three preset receive beams, and it is assumed that a beam 2 is an optimal receive beam.

Step 1: Receive beam alignment, where receive beam alignment of the device A is used as an example for specific description.

Figure 6:
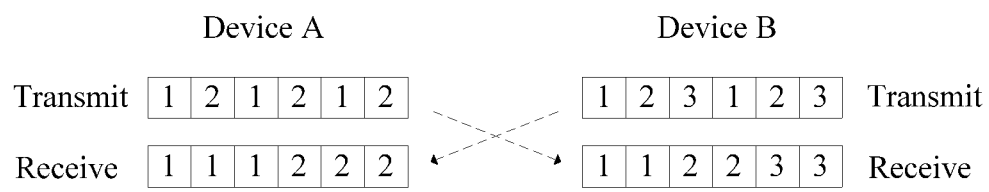
FIG. 6 is a schematic diagram of a beam scanning mode according to an embodiment of the present invention.

1. Receive and transmit beam scanning modes of the device A and the device B are shown in FIG. 6. Different numbers indicate that a beam is changed. A transmit signal frequency is fixed as $F_r$.

Figure 7:
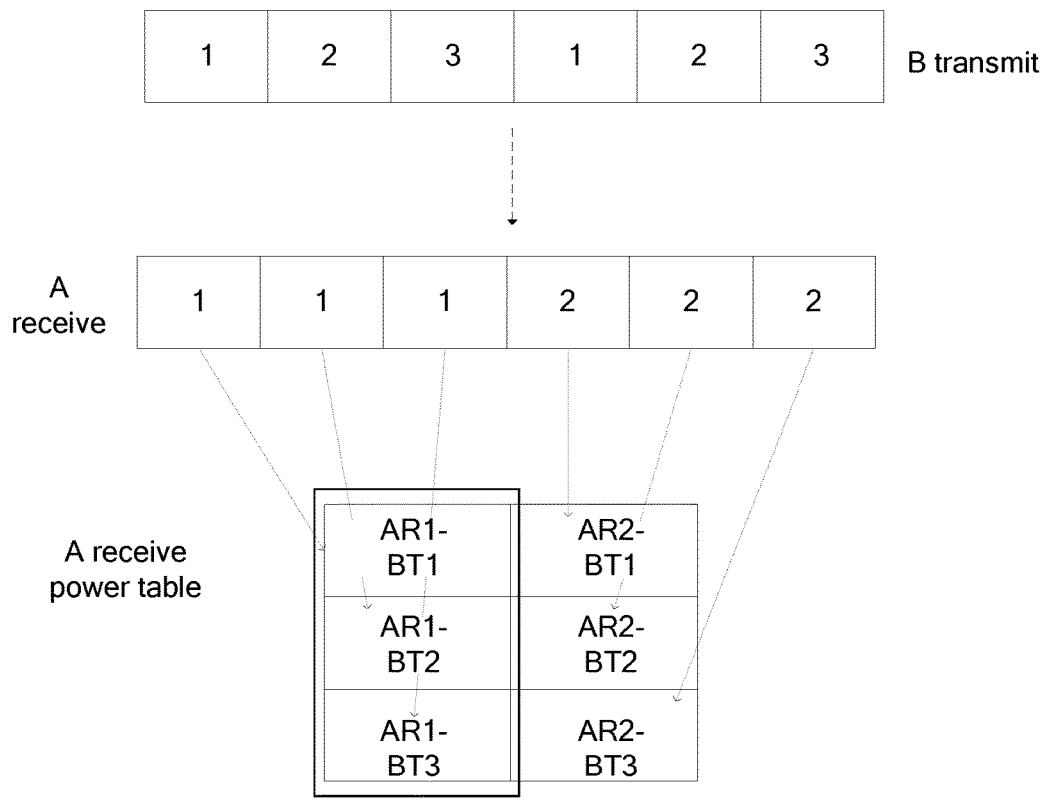
FIG. 7 is a corresponding schematic diagram of a receive power according to an embodiment of the present invention.

2. A receiver of the device A records a receive signal power in each configuration cycle in a receive beam scanning process, and obtains a receive power table shown in FIG. 7.

3. Count the receive power table according to a receive beam number. Because the first receive beam of the device A is the optimal receive beam, it can be found that, in FIG. 7, an accumulated value of powers in the first column is obviously greater than that in the second column, so that the receive beam 1 is the optimal receive beam of the device A.

4. After locking the receive beam 1, the device A notifies, by changing the transmit signal frequency, the peer device that the device A has completed receive beam locking.

Step 2: Transmit beam alignment, where transmit beam alignment of the device A is used as an example.

Figure 8:
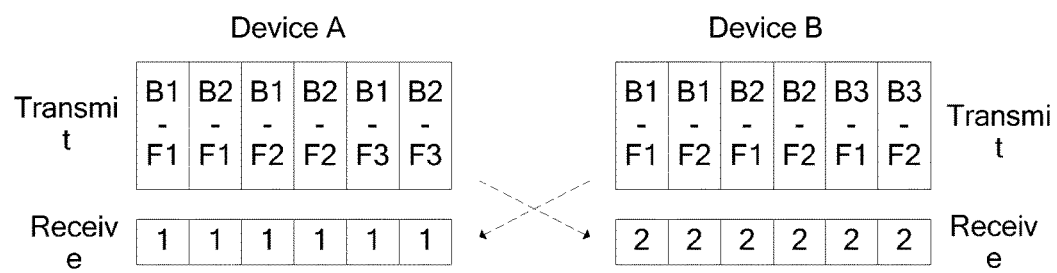
FIG. 8 is a schematic diagram of a beam scanning mode and a frequency scanning mode according to an embodiment of the present invention.

1. After completing respective receive beam locking, and completing automatic allocation of device numbers, the device A and the device B determine a transmit beam scanning mode and a frequency scanning mode according to the numbers. In this embodiment, the transmit beam scanning mode and the frequency scanning mode are shown in FIG. 8. Different Bs indicate different transmit beam directions. Different Fs indicate that a frequency has been switched. At the beginning of this embodiment, frequencies of all numbers of the device A and the device B use $F_d$, that is, $F1=F2=F3=F_d$. When a receive beam of the device A is 1 and a receive beam of the device B is 2, it indicates that the device A and the device B perform reception counting according to their respective transmit cycles.

2. The device A counts a receive signal power in each configuration cycle, and obtains a power table shown in FIG. 9.

Figure 9:
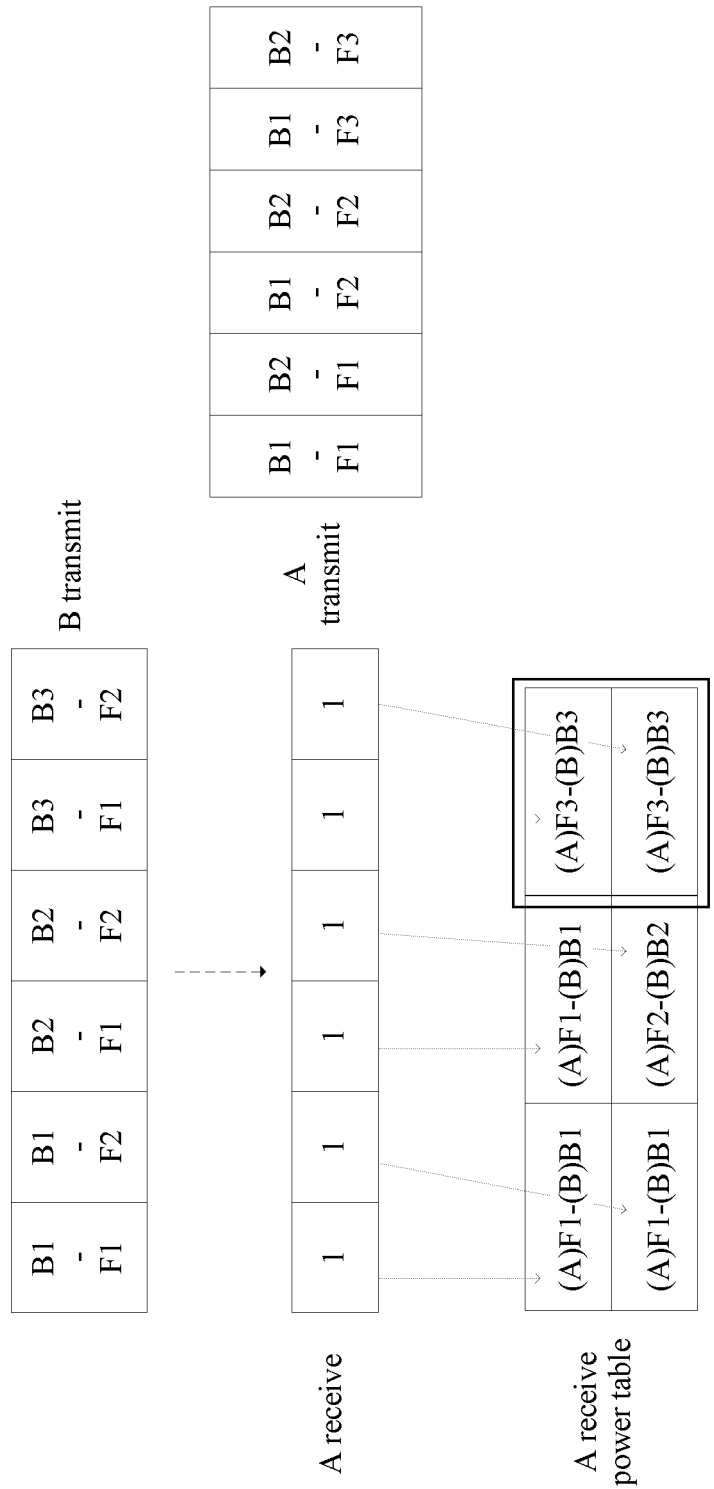
FIG. 9 is a corresponding schematic diagram of another receive power according to an embodiment of the present invention.

3. A receiver of the device A counts a receive power table according to a frequency traversal mode of a transmitter of the device A. As shown in FIG. 9, corresponding powers, in same transmit frequency cycles, in the receive powers are accumulated. Because a traversal mode of a transmit signal frequency of a local device is the same as a traversal mode of a transmit beam of a peer device, this counting manner indirectly reflects a transmit beam alignment status of the peer device. Because the third transmit beam of the device B is the optimal transmit beam direction, it can be found that, in FIG. 9, an accumulated value of powers in the third column is obviously greater than those in the other two columns, so that the device A can determine that the transmit beam 3 of the device B is the optimal transmit beam of the device B.

Figure 10:
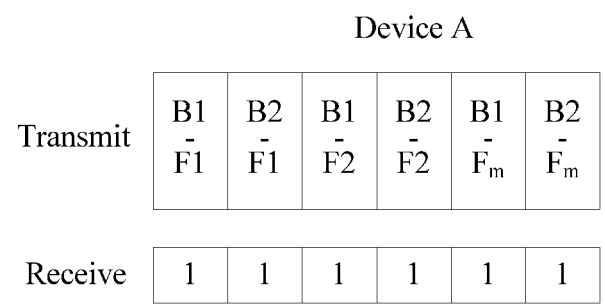
FIG. 10 is a schematic diagram of another beam scanning mode and another frequency scanning mode according to an embodiment of the present invention.

4. After the device A obtains a location corresponding to the highest receive power in FIG. 9, in a next traversal cycle, the device A sets a frequency number, F3 in this case, corresponding to the location of the highest receive power to $F_m$. Sending configuration of the device A in a next cycle is shown in FIG. 10.

Figure 11:
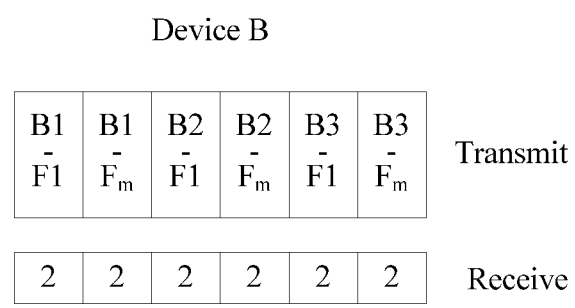
FIG. 11 is a schematic diagram of still another beam scanning mode and still another frequency scanning mode according to an embodiment of the present invention.

5. Likewise, the device B can find an optimal transmit beam direction of the device A according to the same steps in 2, 3, and 4, and set a corresponding $F_m$ signal in sending configuration of the device B. In this case, transmit configuration of the device B is shown in FIG. 11.

6. The receiver of the device A detects a receive signal main frequency in each configuration cycle, to obtain a frequency counting table.

Figure 12:
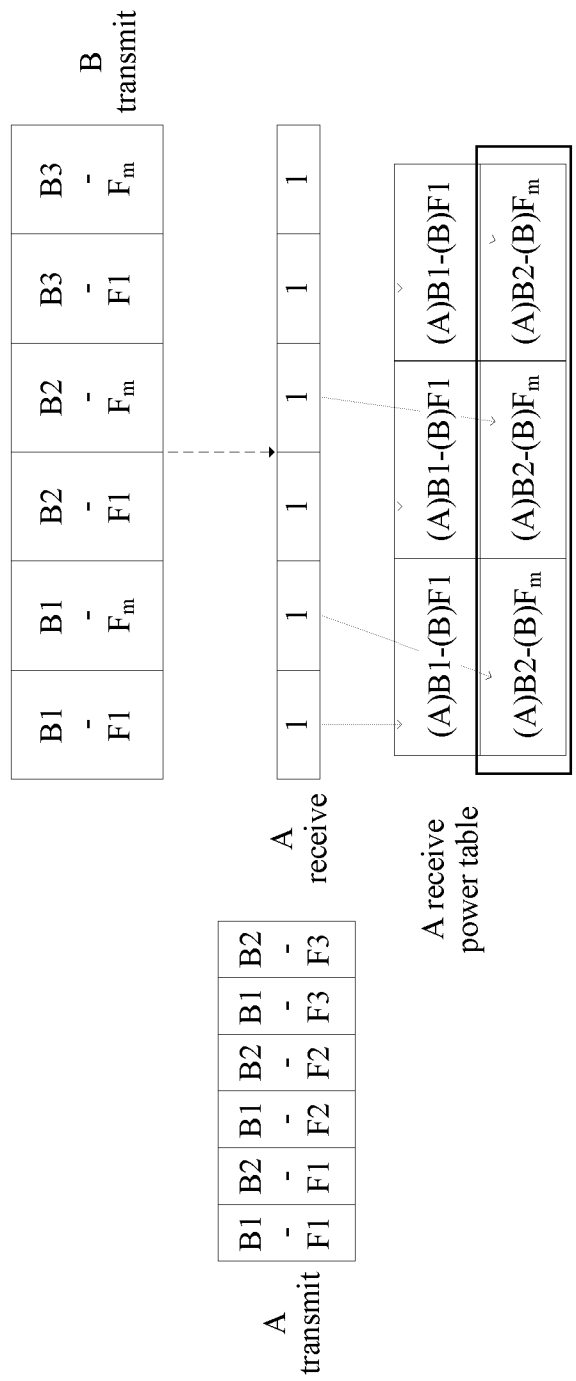
FIG. 12 is a corresponding schematic diagram of a receive frequency according to an embodiment of the present invention.

7. The receiver of the device A counts main frequencies in the receive frequency table according to a transmit beam scanning manner. It can be found from FIG. 12 that, received frequencies $F_m$ mainly appear in the frequency table corresponding to the second row. Therefore, a transmit beam B2 corresponding to this row is the optimal transmit beam of the device A. Up to now, the device A has found its optimal transmit beam direction.

8. Likewise, the device B can find its optimal transmit beam direction according to the steps in 6 and 7. In this example, the direction is a direction of a transmit beam B3.

9. After the device A finds the optimal transmit direction, the device A locks transmit beams into the optimal transmit direction, and continuously detects a receive signal power. After the device B also locks the optimal transmit direction, because beams in receive and transmit directions are kept in a locked state, a signal power detected by the device A does not jitter acutely, and it can be determined from this whether the peer device has completed transmit beam locking.

Figure 13:
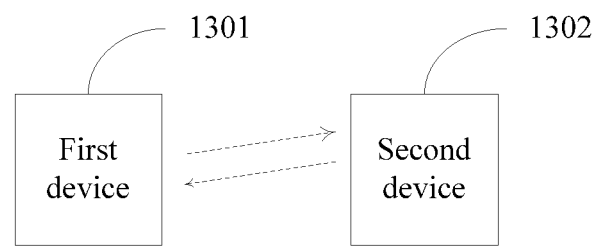
FIG. 13 is an antenna alignment system according to an embodiment of the present invention.

As shown in FIG. 13, an embodiment of the present invention further provides an antenna alignment system, including a first device 1301 and a second device 1302. The alignment system may be used for receive beam alignment. In the following, receive beam alignment of the second device is described. The first device has $N_{AT}$ transmit beams and $N_{AR}$ receive beams, and the second device has $N_{BT}$ transmit beams and $N_{BR}$ receive beams.

The first device is configured to transmit a signal to the second device according to a first cycle, and traverse switching of $N_{AT}$ transmit beams according to a third beam mode, where a transmit beam for transmitting a signal by the first device is unchanged in a same first cycle.

The second device is configured to receive a signal from the first device according to the first cycle, and traverse switching of $N_{BR}$ receive beams according to a fourth beam mode, where a receive beam for receiving a signal by the second device is unchanged in a same first cycle, and each receive beam can receive signals from the $N_{AT}$ transmit beams of the first device.

The second device is configured to count a receive signal power in each first cycle, and obtain a receive signal power corresponding to each receive beam according to the fourth beam mode, to learn that a receive signal power corresponding to an Sth receive beam is the highest.

The second device is configured to fix a receive beam whose receive signal power is the highest as a receive beam.

Optionally, the third beam mode includes $N_{AT} \times N_{BR}$ first cycles, and a transmit beam is switched once each first cycle. The fourth beam mode includes $N_{AT} \times N_{BR}$ first cycles, and a receive beam is switched once every $N_{AT}$ first cycles.

Optionally, the first device is configured to divide each first cycle into N sub-cycles to perform power counting, where N is an odd number greater than 3.

The first device performs receive beam alignment is similar. Details are not described herein. Reference may be made to the foregoing description of the alignment method.

In addition, the alignment system in FIG. 13 may be further used for transmit beam alignment. The first device has $N_{AT}$ transmit beams and $N_{AR}$ receive beams, the second device has $N_{BT}$ transmit beams and $N_{BR}$ receive beams, each receive beam of the first device is fixedly aligned, each receive beam of the second device is fixedly aligned, the receive beams of the first device receive signals from the transmit beams of the second device, and the receive beams of the second device receive signals from the transmit beams of the first device.

The first device is configured to transmit a signal to the second device according to a first cycle, traverse switching of $N_{AT}$ transmit beams according to a first beam mode, and traverse switching of $N_{BT}$ frequencies according to a first frequency mode, where a transmit beam and a frequency for transmitting a signal by the first device are unchanged in a same first cycle.

The second device is configured to transmit a signal to the first device according to the first cycle, traverse switching of $N_{BT}$ transmit beams according to a second beam mode, and traverse switching of $N_{AT}$ frequencies according to a second frequency mode, where a transmit beam and a frequency for transmitting a signal by the second device are unchanged in a same first cycle.

The second device is configured to count a receive signal power in each first cycle, and obtain a receive signal power corresponding to each frequency according to the second frequency mode, to learn that a receive signal power corresponding to an Rth frequency is the highest.

The second device is configured to transmit a signal to the first device according to the first cycle, traverse switching of $N_{BT}$ transmit beams according to the second beam mode, and traverse switching of $N_{AT}$ frequencies according to the second frequency mode, where a transmit beam and a frequency for transmitting a signal by the second device are unchanged in a same first cycle, and the Rth frequency of the $N_{AT}$ frequencies is a specified frequency.

The first device is configured to determine a receive signal frequency in each first cycle, and obtain a receive signal frequency corresponding to each beam according to the first beam mode, to learn that a receive signal frequency corresponding to an Rth beam is the specified frequency.

The first device is configured to fix a beam whose receive signal frequency is the specified frequency as a transmit beam.

Optionally, the first beam mode includes $N_{AT} \times N_{BT}$ first cycles, and a transmit beam is switched once each first cycle. The first frequency mode includes $N_{AT} \times N_{BT}$ first cycles, and a frequency is switched once every $N_{AT}$ first cycles.

Optionally, the second beam mode includes $N_{AT} \times N_{BT}$ first cycles, and a transmit beam is switched once every $N_{AT}$ first cycles. The second frequency mode includes $N_{AT} \times N_{BT}$ first cycles, and a frequency is switched once each first cycle.

Optionally, the first beam mode includes $N_{AT} \times N_{BT}$ first cycles, and a transmit beam is switched once every $N_{BT}$ first cycles. The first frequency mode includes $N_{AT} \times N_{BT}$ first cycles, and a frequency is switched once each first cycle.

Optionally, the second beam mode includes $N_{AT} \times N_{BT}$ first cycles, and a transmit beam is switched once each first cycle. The second frequency mode includes $N_{AT} \times N_{BT}$ first cycles, and a frequency is switched once every $N_{BT}$ first cycles.

Optionally, that the first device determines a receive signal frequency in each first cycle may include that the first device is configured to divide each first cycle into N sub-cycles to perform power counting, where N is an odd number greater than 3, separately determine a frequency of each sub-cycle to obtain N determined frequencies, and use a frequency that occurs most as a receive signal frequency in the first cycle.

Optionally, the $N_{BT}$ frequencies in the first frequency mode are first frequencies, and the $N_{AT}$ frequencies in the second frequency mode are first frequencies.

Figure 14:
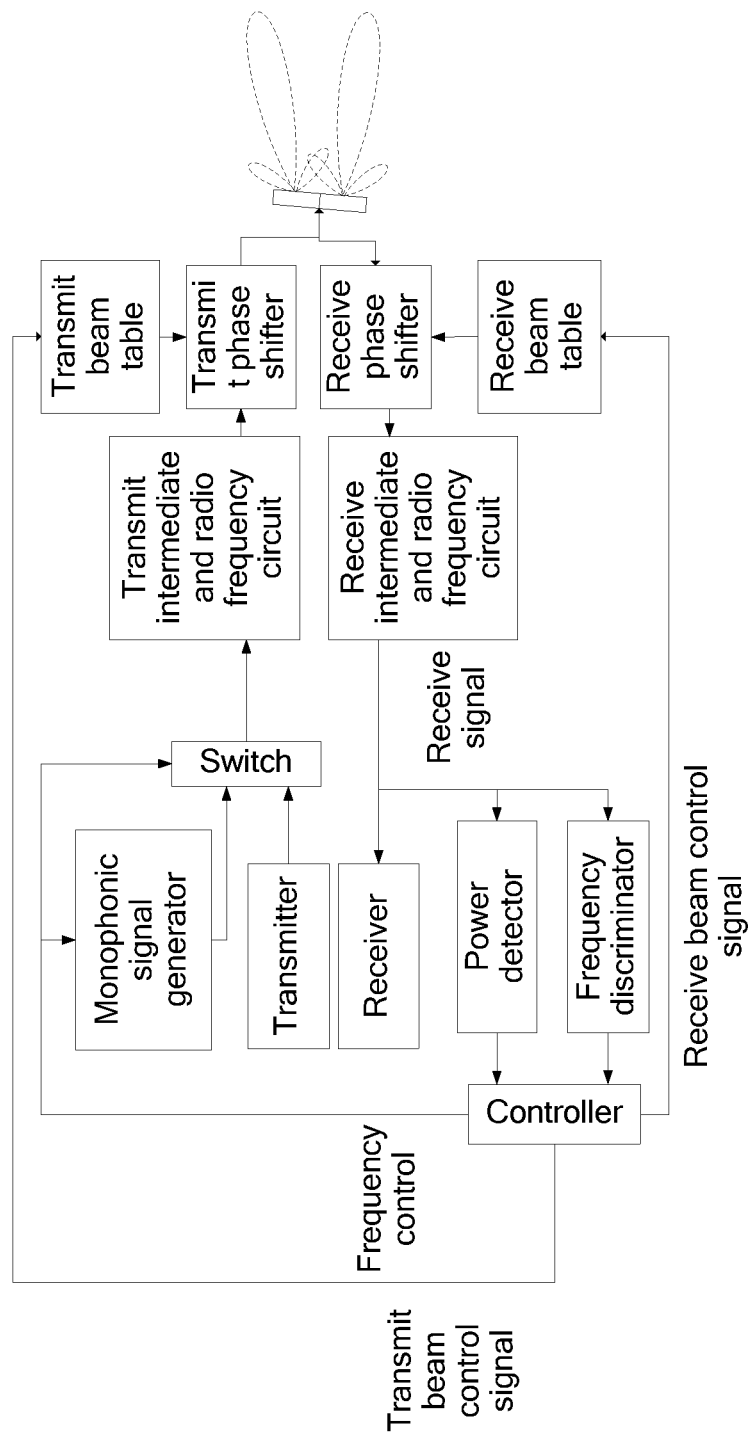
FIG. 14 is a structural diagram of an antenna alignment device according to an embodiment of the present invention.

For ease of understanding, as shown in FIG. 14, a microwave device is used as an example to describe how to implement antenna alignment. A transmitter sends a signal to a transmit antenna by using a switch, an intermediate and radio frequency circuit, and a transmit phase shifter. A transmit beam direction for transmitting a signal can be changed by changing the transmit phase shifter. A receiver receives a signal from a receive antenna by using a receive intermediate and radio frequency circuit, and a receive phase shifter. A receive beam direction for receiving a signal can be changed by changing the receive phase shifter. By using a transmit beam control signal, a controller controls a transmit beam table to configure the transmit phase shifter, to control the transmit beam direction. For example, the transmit beam table stores a lookup table of a transmit beam set. The transmit beam control signal is a beam sequence number. Phase configuration corresponding to a beam is output by looking up the table according to an input beam sequence number. By using a receive beam control signal, the controller controls a receive beam table to configure the receive phase shifter, to control the receive beam direction. For example, the receive beam table stores a lookup table of a receive beam set. The receive beam control signal is a beam sequence number. Phase configuration corresponding to a beam is output by looking up the table according to an input beam sequence number.

Power detection and frequency detection can be performed by coupling some receive signals from the receive intermediate and radio frequency circuit. A power detector detects an amplitude of a receive signal power in a cycle of $T_c$, and outputs an average power value within $T_c$. A frequency discriminator detects frequency information of a receive signal in a cycle of $T_d$, outputs a frequency of a main frequency point component within $T_d$, and sends a detection result to the controller. The controller controls a transmit beam traversal, a transmit frequency traversal, and a receive beam traversal. The controller controls an entire set of apparatus to complete two-way alignment by using the receive power and the frequency information, sequence numbers of receive and transmit beams generated according to a two-way alignment method in the present invention, and a monophonic signal generator and a configuration command for switching a switch.

In FIG. 14, a transmit frequency traversal is controlled by using the monophonic signal generator and the switch. The signal generator generates a monophonic signal $\exp(2 7\pi ft)$ of a fixed frequency f according to a configuration command of the controller. The switch switches a sending signal of the transmitter to a normal communication signal or a monophonic signal according to a configuration command of the controller.

Receive and transmit antenna arrays in FIG. 14 may be a same antenna array such as a time division duplex system, or two separate antenna arrays such as frequency division duplex systems. In the separate antenna arrays, because of antenna array difference, receive and transmit beams are obviously different, and they require separate alignment. However, in a shared antenna array system, because receive and transmit signals pass through different circuits, receive and transmit signals are generally different in channel consistency. Therefore, there is an offset between receive and transmit beams, and they also require separate alignment.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

What is claimed is:

1. An antenna alignment method, comprising:
transmitting, according to a first cycle, by a first device having $N_{AT}$ transmit beams and $N_{AR}$ receive beams, a first signal to a second device having $N_{BT}$ transmit beams and $N_{BR}$ receive beams, the first device traversing switching of $N_{AT}$ transmit beams according to a first beam mode, and the first device traversing switching of $N_{BT}$ frequencies according to a first frequency mode, wherein each receive beam of the first device is fixedly aligned, wherein each receive beam of the second device is fixedly aligned, wherein the receive beams of the first device receive signals from the transmit beams of the second device, wherein the receive beams of the second device receive signals from the transmit beams of the first device, and wherein a transmit beam and a frequency for transmitting the first signal by the first device are unchanged in a same first cycle;
transmitting, by the second device, a second signal to the first device according to the first cycle, the second device traversing switching of $N_{BT}$ transmit beams according to a second beam mode, and the second device traversing switching of $N_{AT}$ frequencies according to a second frequency mode, wherein a transmit beam and a frequency for transmitting the second signal by the second device are unchanged in asame first cycle;
counting, by the second device, a receive signal power in each first cycle, and obtaining a receive signal power corresponding to each frequency according to the second frequency mode, to determine that a respective receive signal power corresponding to an Rth frequency is the highest of the receive signal powers in each first cycle;
transmitting, by the second device, a third signal to the first device according to the first cycle, traversing switching of $N_{BT}$ transmit beams according to the second beam mode, and traversing switching of $N_{AT}$ frequencies according to the second frequency mode, wherein a transmit beam and a frequency for transmitting the third signal by the second device are unchanged in a same first cycle, and the Rth frequency of the $N_{AT}$ frequencies is a specified frequency;

determining, by the first device, a receive signal frequency in each first cycle, and obtaining a receive signal frequency corresponding to each beam according to the first beam mode, determining that a receive signal frequency corresponding to an Rth beam is the specified frequency; and permanently using, by the first device, a beam whose receive signal frequency is the specified frequency as a transmit beam.

2. The method according to claim 1, wherein the first beam mode comprises $N_{AT} \times N_{BT}$ first cycles, and a transmit beam is switched once each first cycle; and wherein the first frequency mode comprises $N_{AT} \times N_{BT}$ first cycles, and a frequency is switched once every $N_{AT}$ first cycles.

3. The method according to claim 2, wherein the second beam mode comprises $N_{AT} \times N_{BT}$ first cycles, and wherein a transmit beam is switched once every $N_{AT}$ first cycles; and wherein the second frequency mode comprises $N_{AT} \times N_{BT}$ first cycles, and a frequency is switched once each first cycle.

4. The method according to claim 1, wherein the first beam mode comprises $N_{AT} \times N_{BT}$ first cycles, and a transmit beam is switched once every $N_{BT}$ first cycles;

wherein the first frequency mode comprises $N_{AT} \times N_{BT}$ first cycles, and a frequency is switched once each first cycle;

wherein the second beam mode comprises $N_{AT} \times N_{BT}$ first cycles, and a transmit beam is switched once each first cycle; and wherein the second frequency mode comprises $N_{AT} \times N_{BT}$ first cycles, and a frequency is switched once every $N_{BT}$ first cycles.

5. The method according to claim 1, wherein the determining the receive signal frequency in each first cycle comprises: dividing, by the first device, each first cycle into N sub-cycles, wherein N is an odd number greater than 3;

separately determining a frequency of each sub-cycle to obtain N determined frequencies; and using a frequency that occurs most as a receive signal frequency in the first cycle.

6. The method according to claim 1, wherein $N_{BT}$ frequencies of the first frequency mode are first frequencies, and $N_{AT}$ frequencies of the second frequency mode are first frequencies.

7. The method according to claim 1, further comprising fixedly aligning each receive beam of the second device, the fixedly aligning comprising:

transmitting, by the first device, a fourth signal to the second device according to the first cycle, and traversing switching of $N_{AT}$ transmit beams according to a third beam mode, wherein a transmit beam for transmitting the fourth signal by the first device is unchanged in a same first cycle;

receiving, by the second device, a fifth signal from the first device according to the first cycle, and traversing switching of $N_{BR}$ receive beams according to a fourth beam mode, wherein a receive beam for receiving the fifth signal by the second device is unchanged in a same first cycle, and wherein each receive beam can receive signals from the $N_{AT}$ transmit beams of the first device;

counting, by the second device, a receive signal power in each first cycle, and obtaining a receive signal power corresponding to each receive beam according to the fourth beam mode, to determining that a receive signal power corresponding to an Sth receive beam is the highest of the receive signal powers corresponding the receive beams; and fixing, by the second device, a receive beam whose receive signal power is the highest as a receive beam.

8. An antenna alignment method, wherein a first device, a second device, and the method comprises:

transmitting, according to a first cycle and by a first device having $N_{AT}$ transmit beams and $N_{AR}$ receive beams, a signal to a second device having $N_{BT}$ transmit beams and $N_{BR}$ receive beams, and traversing switching of $N_{AT}$ transmit beams according to a third beam mode, wherein a transmit beam for transmitting a signal by the first device is unchanged in a same first cycle;

receiving, by the second device, a second signal from the first device according to the first cycle, and traversing switching of $N_{BR}$ receive beams according to a fourth beam mode, wherein a receive beam for receiving the second signal by the second device is unchanged in a same first cycle, and each receive beam can receive signals from the $N_{AT}$ transmit beams of the first device;

counting, by the second device, a receive signal power in each first cycle, and obtaining a receive signal power corresponding to each receive beam according to the fourth beam mode, to determine that a receive signal power corresponding to an Sth receive beam is the highest of the receive signal powers in each first cycle; and fixing, by the second device, a receive beam whose receive signal power is the highest as a receive beam.

9. The method according to claim 8, wherein the third beam mode comprises $N_{AT} \times N_{BR}$ first cycles, and wherein a transmit beam is switched once each first cycle.

10. The method according to claim 9, wherein the fourth beam mode comprises $N_{AT} \times N_{BR}$ first cycles, and wherein a receive beam is switched once every $N_{AT}$ first cycles.

11. An antenna alignment system, comprising:

a first device, wherein the first device has $N_{AT}$ transmit beams and $N_{AR}$ receive beams, wherein each receive beam of the first device is fixedly aligned; and a second device, wherein the second device has $N_{BT}$ transmit beams and $N_{BR}$ receive beams, wherein each receive beam of the second device is fixedly aligned, wherein the receive beams of the first device receive signals from the transmit beams of the second device, and the receive beams of the second device receive signals from the transmit beams of the first device;

wherein the first device is configured to transmit a first signal to the second device according to a first cycle, wherein the first device is further configured to traverse switching of $N_{AT}$ transmit beams according to a first beam mode, and wherein the first device is further configured to traverse switching of $N_{BT}$ frequencies according to a first frequency mode, wherein a transmit beam and a frequency for transmitting the first signal by the first device are unchanged in a same first cycle;

wherein the second device is configured to transmit a second signal to the first device according to the first cycle, wherein the second device is further configured to traverse switching of $N_{BT}$ transmit beams according to a second beam mode, and wherein the second device is further configured to traverse switching of $N_{AT}$ frequencies according to a second frequency mode, wherein a transmit beam and a frequency for transmitting the second signal by the second device are unchanged in a same first cycle;

the second device is configured to count a receive signal power in each first cycle, and obtain a receive signal power corresponding to each frequency according to the second frequency mode, to learn that a receive signal power corresponding to an Rth frequency is the highest;

wherein the second device is configured to transmit a third signal to the first device according to the first cycle, wherein the second device is further configured to traverse switching of $N_{BT}$ transmit beams according to the second beam mode, and wherein the second device is further configured to traverse switching of $N_{AT}$ frequencies according to the second frequency mode, wherein a transmit beam and a frequency for transmitting the third signal by the second device are unchanged in a same first cycle, and wherein the Rth frequency of the $N_{AT}$ frequencies is a specified frequency;

wherein the first device is configured to determine a receive signal frequency in each first cycle, and obtain a receive signal frequency corresponding to each beam according to the first beam mode, to determine that a receive signal frequency corresponding to an Rth beam is the specified frequency; and wherein the first device is configured to fix a beam whose receive signal frequency is the specified frequency as a transmit beam.

12. The system according to claim 11, wherein the first beam mode comprises $N_{AT} \times N_{BT}$ first cycles, and wherein a transmit beam is switched once each first cycle; and wherein the first frequency mode comprises $N_{AT} \times N_{BT}$ first cycles, and wherein a frequency is switched once every $N_{AT}$ first cycles.

13. The system according to claim 12, wherein the second beam mode comprises $N_{AT} \times N_{BT}$ first cycles, and wherein a transmit beam is switched once every $N_{AT}$ first cycles; and wherein the second frequency mode comprises $N_{AT} \times N_{BT}$ first cycles, and wherein a frequency is switched once each first cycle.

14. The system according to claim 11, wherein the first beam mode comprises $N_{AT} \times N_{BT}$ first cycles, and wherein a transmit beam is switched once every $N_{BT}$ first cycles;

wherein the first frequency mode comprises $N_{AT} \times N_{BT}$ first cycles, and wherein a frequency is switched once each first cycle;

wherein the second beam mode comprises $N_{AT} \times N_{BT}$ first cycles, and wherein a transmit beam is switched once each first cycle; and wherein the second frequency mode comprises $N_{AT} \times N_{BT}$ first cycles, and a frequency is switched once every $N_{BT}$ first cycles.

15. The system according to claim 11, wherein that the first device is configured to determine the receive signal frequency in each first cycle by:

dividing each first cycle into N sub-cycles to perform power counting, wherein N is an odd number greater than 3, separately determining a frequency of each sub-cycle to obtain N determined frequencies, and using a frequency that occurs most as a receive signal frequency in the first cycle.

16. The system according to claim 11, wherein $N_{BT}$ frequencies of the first frequency mode are first frequencies, and wherein $N_{AT}$ frequencies of the second frequency mode are first frequencies.

17. The system according to claim 11, wherein the first device is configured to transmit a fourth signal to the second device according to the first cycle, and wherein the first device is further configured to traverse switching of $N_{AT}$ transmit beams according to a third beam mode, wherein a transmit beam for transmitting the fourth signal by the first device is unchanged in a same first cycle;

wherein the second device is configured to receive a fifth signal from the first device according to the first cycle, and wherein the second device is further configured to traverse switching of $N_{BR}$ receive beams according to a fourth beam mode, wherein a receive beam for receiving the fifth signal by the second device is unchanged in a same first cycle, and each receive beam can receive signals from the $N_{AT}$ transmit beams of the first device;

wherein the second device is configured to count a receive signal power in each first cycle, and obtain a receive signal power corresponding to each receive beam according to the fourth beam mode, to determine that a receive signal power corresponding to an Sth receive beam is the highest of the receive signal powers in each first cycle; and wherein the second device is configured to fix a receive beam whose receive signal power is the highest as a receive beam.

18. An antenna alignment system, comprising:

a first device, wherein the first device has $N_{AT}$ transmit beams and $N_{AR}$ receive beams,; and a second device, wherein the second device has $N_{BT}$ transmit beams and $N_{BR}$ receive beams;

where the first device is configured to transmit a first signal to the second device according to a first cycle, and wherein the first device is further configured to traverse switching of $N_{AT}$ transmit beams according to a third beam mode, wherein a transmit beam for transmitting the first signal by the first device is unchanged in a same first cycle;

wherein the second device is configured to receive a second signal from the first device according to the first cycle, and wherein the second device is further configured to traverse switching of $N_{BR}$ receive beams according to a fourth beam mode, wherein a receive beam for receiving the second signal by the second device is unchanged in a same first cycle, and wherein each receive beam can receive signals from the $N_{AT}$ transmit beams of the first device;

where the second device is further configured to count a receive signal power in each first cycle, and wherein the second device is further configured to obtain a receive signal power corresponding to each receive beam according to the fourth beam mode, to determine that a receive signal power corresponding to an Sth receive beam is the highest receive signal power in each first cycle; and wherein the second device is configured to fix a receive beam whose receive signal power is the highest as a receive beam.

19. The system according to claim 18, wherein the third beam mode comprises $N_{AT} \times N_{BR}$ first cycles, and wherein a transmit beam is switched once each first cycle.

20. The system according to claim 19, wherein the fourth beam mode comprises $N_{AT} \times N_{BR}$ first cycles, and wherein a receive beam is switched once every $N_{AT}$ first cycles.

* * * * *